Feb. 2, 1960　　　　　L. G. LOMBI　　　　2,923,258
MIXING AND KNEADING MACHINE
Filed March 10, 1958　　　　　　　　　2 Sheets-Sheet 1
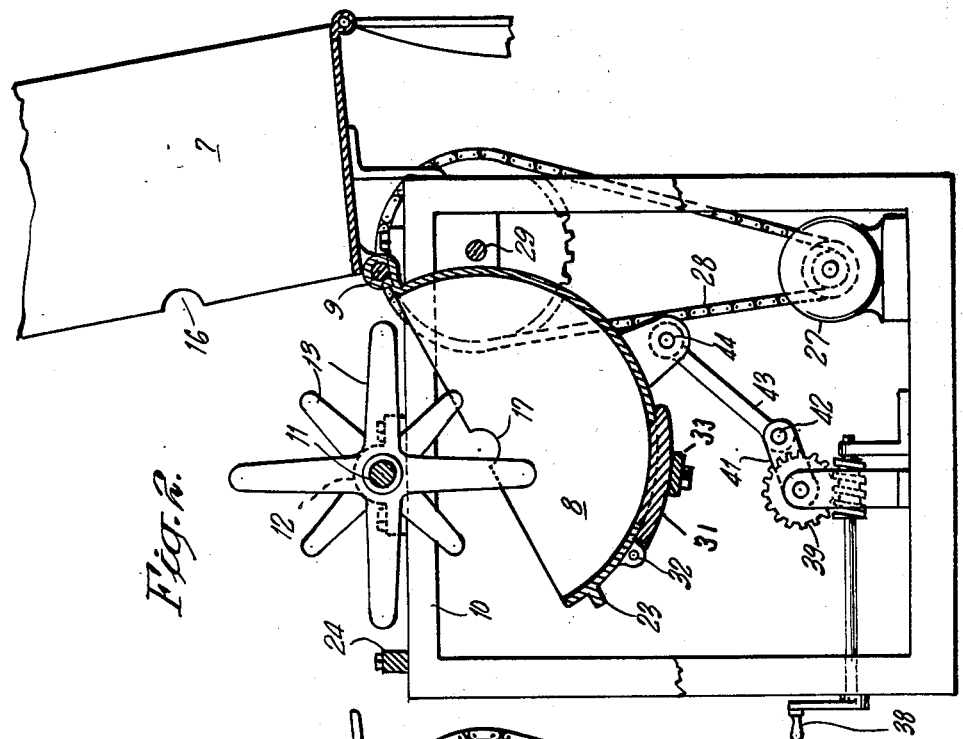
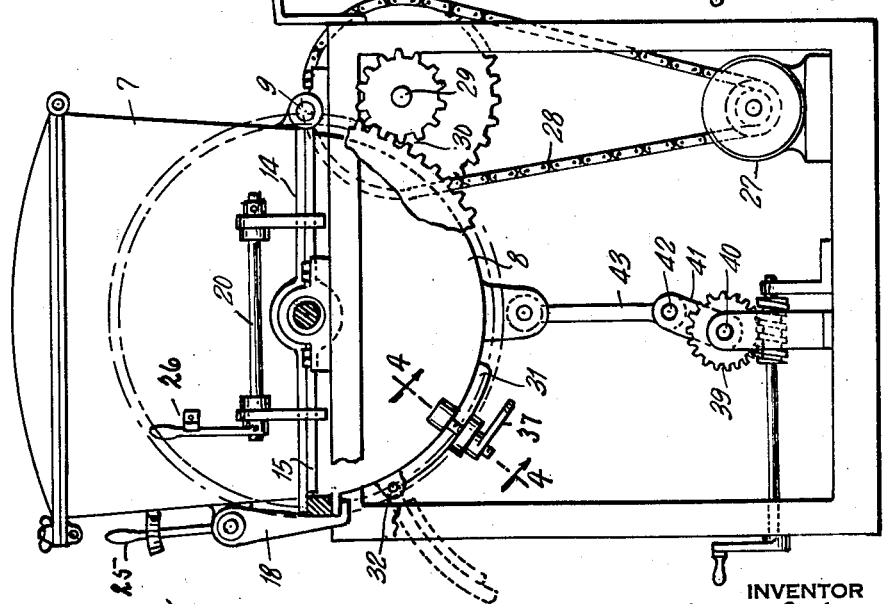
INVENTOR
*Louis G. Lombi*
BY
ATTORNEY Feb. 2, 1960     L. G. LOMBI     2,923,258
MIXING AND KNEADING MACHINE
Filed March 10, 1958     2 Sheets-Sheet 2
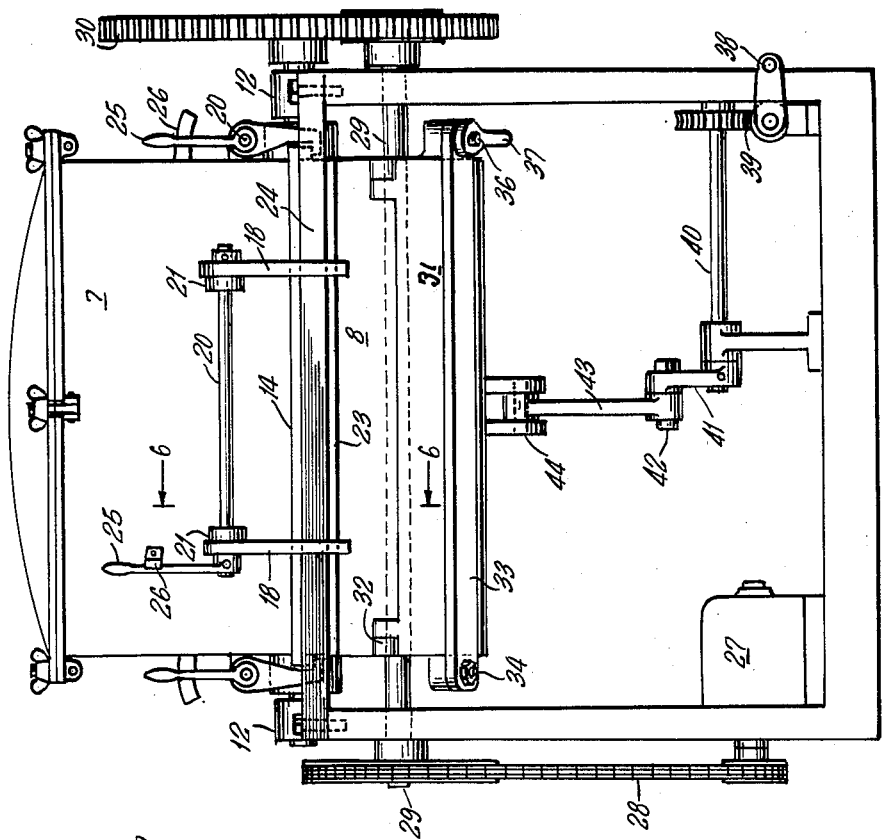
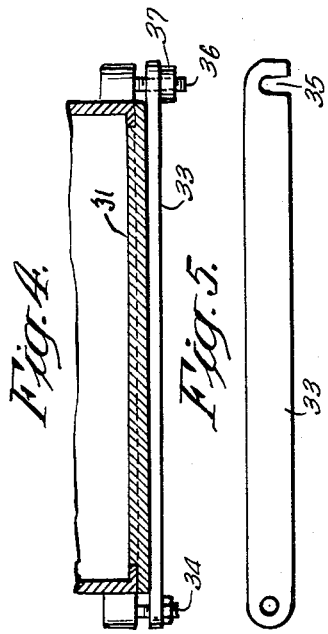
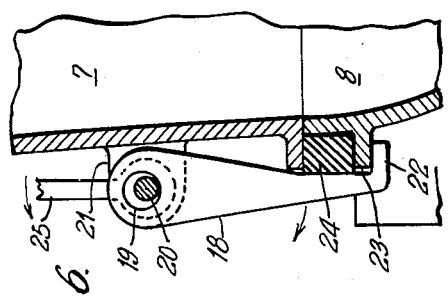
INVENTOR
LOUIS G. LOMBI
BY
ATTORNEY

United States Patent Office 2,923,258
Patented Feb. 2, 1960

2,923,258

MIXING AND KNEADING MACHINE

Louis G. Lombi, Bergenfield, N.J.

Application March 10, 1958, Serial No. 720,123

1 Claim. (Cl. 107—36)

The invention here disclosed relates to the mixing, blending and kneading of dough.

Objects of the invention are to enable all necessary mixing, blending and kneading operations to be accomplished in one and the same machine and to have this machine in a simple practical form, easy and safe to operate.

Special objects of the invention are to facilitate unloading and cleaning operations and to assure complete closing and sealing of the mixing hopper.

Other desirable objects and the novel features through which the purposes of the invention are attained are set forth and will appear in the course of the following specification.

The drawings accompanying and forming part of the specification illustrate a present commercial embodiment of the invention. Structure however, may be modified and changed as regards the immediate illustration, all within the true intent and scope of the invention as hereinafter defined and claimed.

Fig. 1 in the drawings is a part sectional broken end elevation of the machine with the hopper closed and with broken lines indicating how the door in the bottom of the hopper may be swung open to discharge contents.

Fig. 2 is a broken vertical sectional view showing the upper and lower hopper sections respectively raised and lowered.

Fig. 3 is a front elevation of the machine in the closed condition.

Fig. 4 is a broken sectional view of the discharge door construction as appearing on substantially the plane of line 4—4 of Fig. 1.

Fig. 5 is an elevation of the hook lever for securing the dump door closed.

Fig. 6 is an enlarged broken sectional detail of one of the front clamp hooks as on substantially the plane of line 6—6 of Fig. 3.

In Figs. 1 and 2, the mixing and kneading hopper is shown as made up of upper and lower companion sections 7 and 8, pivotally hinged together at the back at 9, on the supporting frame 10.

A beater shaft 11, is journalled in fixed bearings 12, on this frame and carries beater arms or blades 13, suited to the particular purposes of the machine.

The upper and lower hopper sections are shown as having abutting flanges 14, 15, about their edges, parting on a horizontal line intersecting the shaft axis and having mating recesses 16, 17, for free passage of the shaft.

To secure the hopper sections solidly together, special clamps are provided at the front and ends of the machine.

The front clamps are shown in the form of hooks 18, supported on eccentric cams 19, carried by shaft 20, journalled in bearings 21, on the front of the upper hopper section and having angled lower ends 22, to engage beneath the flange 23, at the front edge of the bottom section.

Figs. 1, 3 and 6 show how the flange 14, at the front end of the upper section rests upon a stationary stop bar 24, and how the hooks 18, pull the bottom section up against the lower side of this stop bar, thus to bring the two sections solidly together, without binding either or both sections against the beater shaft.

The cam shaft 20 is shown equipped with a handle 25, at one end releasably held by a quadrant 26.

The hook clamps at the ends of the machine are of the same general construction, corresponding reference numerals being applied thereto.

Fig. 3 shows how the hopper, with parts described, is located wholly between the end bearings 12, and how the gearing for operating the beater is located outside the ends of the frame, clear of the hopper.

This drive gearing is shown as comprising a motor 27, connected by sprocket chain 28, at one end of the machine with shaft 29, and the latter connected by gearing 30, at the opposite end of the machine with the beater shaft.

Quick and convenient dumping of the hopper is provided for in the present machine by a door 31, hinged at its upper end at 32, in the front of the bottom section and arranged to be secured closed by a bar 33, extending over the outer face of the door, pivotally supported at one end at 34, and having a hook 35, at the opposite end to engage over a bolt 36, and be adjustably secured by a hand screw 37, engaged on that bolt.

This construction enables the door to be firmly secured but to be instantly released when desired, to dump contents of the bowl even with the beater in operation.

The bottom or bowl section of the hopper is raised and lowered in the machine illustrated by a hand crank 38, located at the front of the machine, connected by worm gearing 39, with a shaft 40, carrying a lever 41, pivoted at 42, to the lower end of a link 43, pivotally connected with the bottom section at 44.

This worm gearing leverage system provides ample power for raising and lowering the bottom of the hopper operable by hand from a safe position at the front of the machine.

What is claimed is:

A mixing and kneading machine comprising the combination of a supporting frame, a beater including a beater shaft journaled on said frame, a mixing hopper having upper and lower companion sections hingedly mounted on said frame at one side of said beater shaft and recessed to close together over said beater shaft, a hopper section positioning stop bar on said frame at the opposite side of said beater shaft and interposed between said upper and lower hopper sections to determine the closed position of said hopper sections, a closure hook mounted on one of said hopper sections and extending beyond that section and about said interposed positioning stop bar into gripping engagement with the other hopper section, means for tightening and holding or for releasing said closure hook to secure said upper and lower hopper sections together about said positioning bar or for permitting lowering of the lower, bottom section of the hopper, manually operable means for lowering and holding said bottom section of the hopper in various lowered positions and for raising said bottom section into the upper fully closed position, a discharge door in said bottom section of the hopper operable to discharge contents independently of operation of the beater and independently of the raised or lowered position of the hopper bottom, manually operable means for securing said discharge door in closed position or for releasing the same to discharge contents of the hopper and gearing on said frame for driving said beater shaft independently of said hopper and discharge door operations.

References Cited in the file of this patent

UNITED STATES PATENTS

| | | |
|---|---|---|
| 417,310 | Castleman | Dec. 17, 1889 |
| 514,048 | Wagner | Feb. 6, 1894 |
| 643,920 | Townsend | Feb. 20, 1900 |
| 662,978 | Schmidt | Dec. 4, 1900 |
| 736,053 | Armstrong | Aug. 11, 1903 |
| 921,361 | Chambers | May 11, 1909 |
| 940,606 | Medart | Nov. 16, 1909 |
| 984,521 | Aldred et al. | Feb. 21, 1911 |
| 2,082,753 | Parsons et al. | June 1, 1937 |